July 11, 1933.  M. A. LISSMAN  1,917,266
METHOD AND APPARATUS FOR DISPERSING DIVIDED SOLID MATERIAL IN GAS
Filed July 7, 1931  4 Sheets-Sheet 1
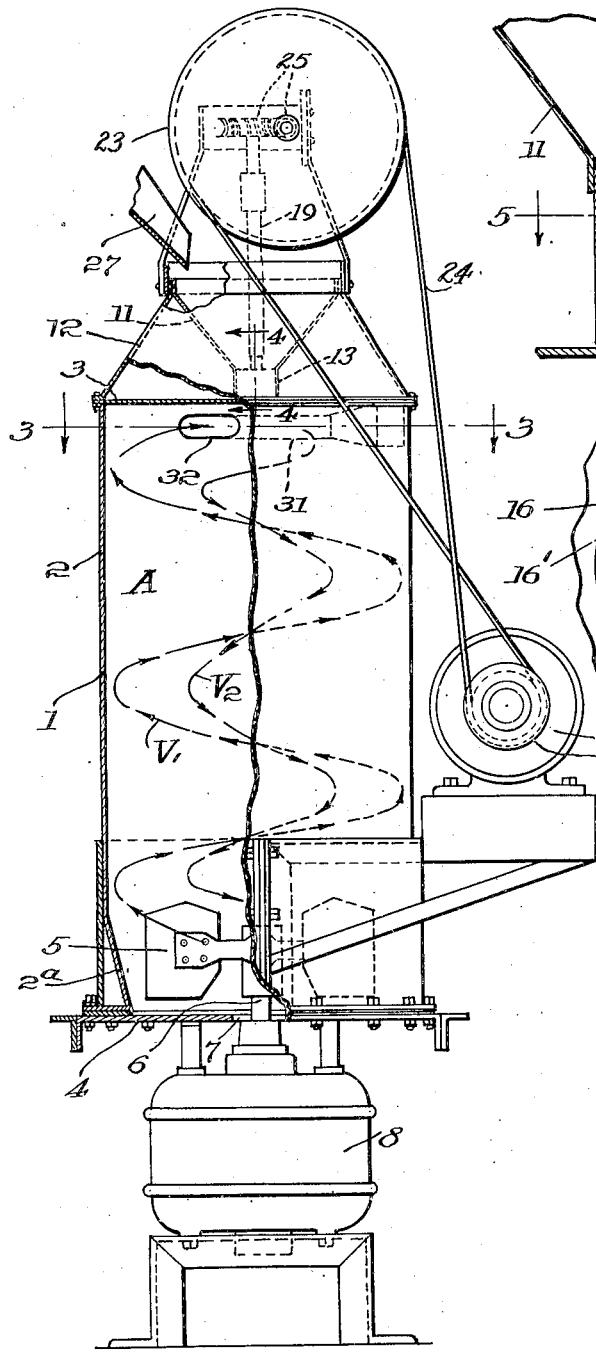
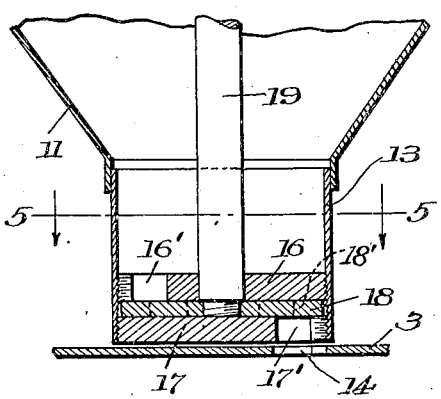
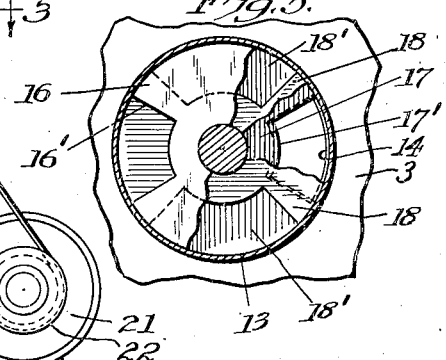
INVENTOR.
Marcel A. Lissman,
BY
ATTORNEYS.

July 11, 1933.   M. A. LISSMAN   1,917,266
METHOD AND APPARATUS FOR DISPERSING DIVIDED SOLID MATERIAL IN GAS
Filed July 7, 1931   4 Sheets-Sheet 2
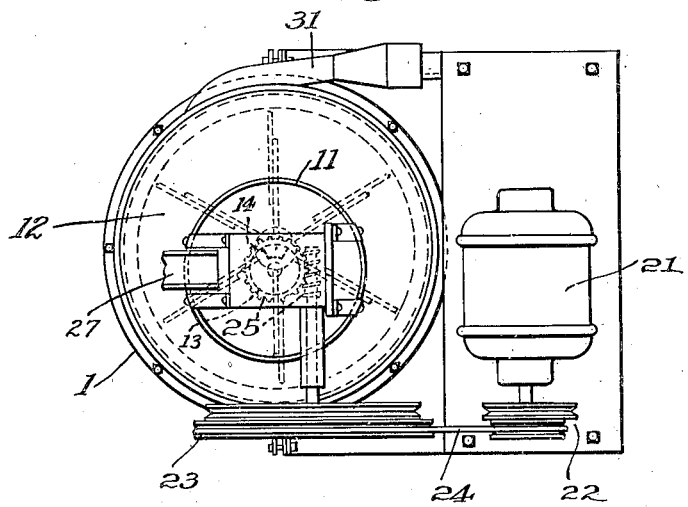
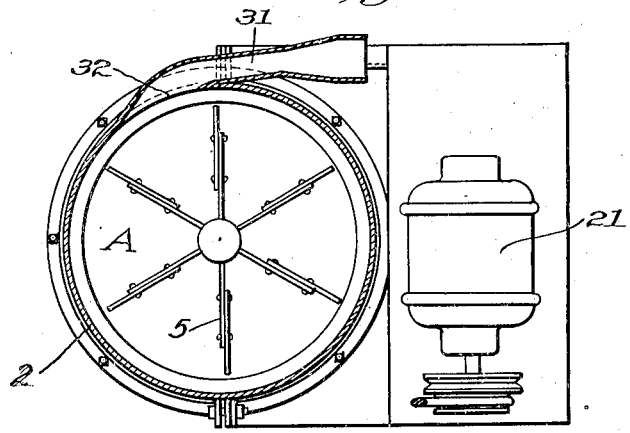
INVENTOR.
Marcel A. Lissman,
BY
ATTORNEYS.

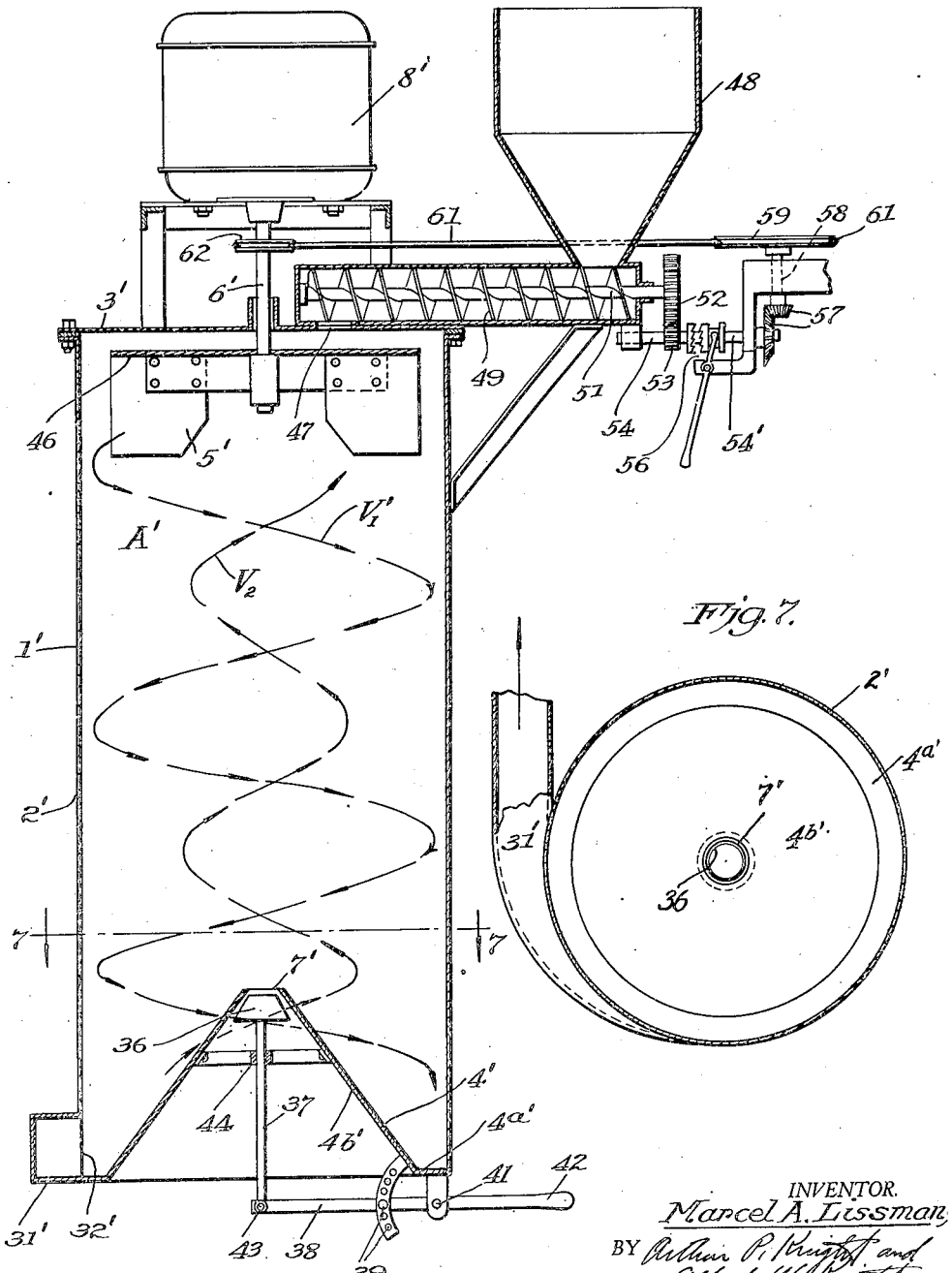

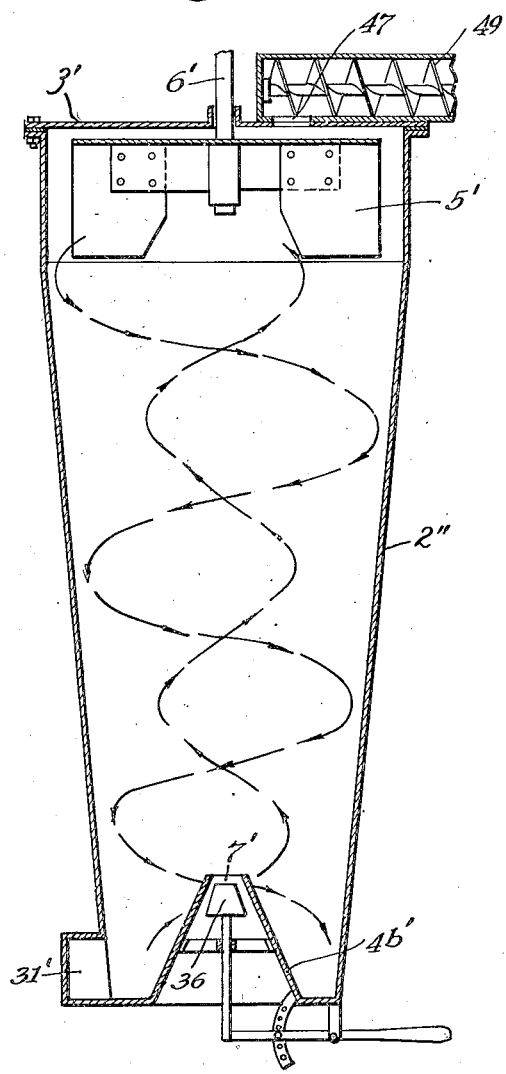

Patented July 11, 1933

1,917,266

UNITED STATES PATENT OFFICE

MARCEL A. LISSMAN, OF ALHAMBRA, CALIFORNIA, ASSIGNOR TO INTERNATIONAL PRECIPITATION COMPANY, OF LOS ANGELES, CALIFORNIA, A CORPORATION OF CALIFORNIA

METHOD AND APPARATUS FOR DISPERSING DIVIDED SOLID MATERIAL IN GAS

Application filed July 7, 1931. Serial No. 549,152.

This invention relates to the mechanical dispersion of finely divided solid material in air or other gas, and the principal object of the invention is to provide a novel and advantageous method and apparatus for effecting such dispersion, and particularly for effecting as complete as possible a dispersion or separation of the individual particles of solid material from one another. The invention is particularly useful in the dispersion of material containing a considerable proportion of fines or "flour", the particles of which tend to adhere to one another or to larger particles.

In elutriation and classification of divided solid material involving suspension of such materials in a stream of air or other gas, one of the most important requirements for maximum efficiency and sharpness of separation of particles of different sizes is the obtaining of the maximum dispersion or separation of the individual particles, and this requirement has heretofore been met only in a very crude manner. In elutriation, it is customary to have an air stream play upon the sample and so gradually disperse it. However, when it is desired to separate the finer fractions, it is found that the air stream has a packing effect upon portions of the sample, and the energy in the air stream is insufficient to wash off or dislodge the adhering fines from the coarser particles, thus preventing complete dispersion and resulting in failure to obtain a sufficiently sharp and complete separation of sizes.

In classification, it is customary to feed the material into an air stream having a sufficiently high velocity to substantially prevent settling of such material therein, so that the material is carried along by the air stream to the classifying means. In order to obtain complete dispersion in this manner, the velocity of the air stream and the volume of air required become prohibitively large, and the velocities and volumes of air ordinarily employed result only in very imperfect dispersion. Even then a classifying means is required to handle a large amount of excess air and must therefore be of large size and great expense, while the excessive power requirements involved in furnishing the desired volume and velocity of air constitute a further source of considerable expense.

According to the present invention, the dispersion of divided solid material in gas is obtained by making use of the characteristics of a rapid vortical motion of a circulating body of air or gas confined within a container of circular cross-section and preferably of cylindrical or frusto-conical form. The divided solid materials which it is desired to disperse are introduced into the vortex and, due to the rapidity of the vortical motion, are continuously subjected to high radial accelerations and are caused to repeatedly cross the stream lines of the vortical motion, and are thus subjected to an extremely vigorous shearing action at the surface of the particles which effectively breaks up adhering clusters of particles and washes the fines off the surfaces of the coarser particles. The solid material thus dispersed in the air stream is continually removed from the container in suspension in only a relatively small proportion of the gas stream, such removal being preferably effected at or adjacent the periphery of the vortex, where the concentration of dispersed solid material is the greatest. A small amount of air is continuously admitted to the container at a point of relatively low pressure in the vortex, to compensate for the air discharged with the dispersed material. Only a very small amount of air is thus required for actually transporting the dispersed material from the dispersion apparatus, requiring a minimum amount of power and a classification or elutriation apparatus of relatively small size. Furthermore, the power required for maintaining the vortical motion within the dispersion apparatus is relatively small because it is only necessary to supply sufficient energy to overcome the friction of the whirling gas against the walls of the container, due to the fact that the gas is repeatedly circulated in the vortex and serves for dispersion of additional quantities of suspended material during each complete circuit thereof.

While the method and apparatus of the present invention are intended particularly for use in elutriation and classification apparatus, they may be used, in general, whenever it is desired to disperse divided solid material in a gas stream, for example for obtaining complete dispersion of a sample of powdered material in air or gas for use in making tests to determine the efficiency of collection obtainable with that particular powdered material in any certain type of collecting apparatus, such as a cyclone separator, bag filter, or the like.

Another field of utility of this invention is in the application of insecticides or similar agents in powdered form, by dusting the same into the air from suitable dispersing apparatus carried by aeroplane over areas of growing trees or plants and allowing the same to fall uniformly upon such trees or plants. In such cases it is important, for most efficient results to secure as thorough as possible a dispersion of the powdered material into the air, for which purpose the method and apparatus of the present invention are particularly well adapted.

The accompanying drawings illustrate certain forms of apparatus according to the present invention, and referring thereto:

Fig. 1 is a partly sectional side elevation of one form of such apparatus.

Fig. 2 is a plan view thereof.

Fig. 3 is a horizontal section on line 3—3 in Fig. 1.

Fig. 4 is an enlarged sectional view on line 4—4 in Fig. 1.

Fig. 5 is a section on line 5—5 in Fig. 4.

Fig. 6 is a vertical section of another form of such apparatus.

Fig. 7 is a horizontal section on line 7—7 in Fig. 6.

Fig. 8 is a vertical section showing a modification in the shape of the dispersion chamber of an apparatus of the general type shown in Figs. 6 and 7.

The form of apparatus shown in Figs. 1 to 5 inclusive, comprises a cylindrical housing or container 1 comprising cylindrical side wall 2 and top and bottom walls 3 and 4 respectively, the interior of said housing constituting a cylindrical dispersion chamber A. A centrifugal fan impeller 5 is rotatably mounted in the lower portion of said chamber, said impeller being mounted on shaft 6 extending through an opening 7 in the bottom wall 4 and driven by electric motor 8. The axis of rotation of the fan impeller preferably coincides substantially with the axis of the chamber A. The opening 7 is of somewhat larger diameter than shaft 6, so that a limited quantity of air may be drawn into the chamber at this point, which is obviously a point of relatively low pressure in the vortex. The side wall 2 is shown as having its lower end portion 2*a* inclined inwardly and downwardly around the fan impeller, as shown.

The divided solid material may be delivered into the dispersion chamber through a feed hopper 11 disposed above said chamber and within a frusto-conical upper housing 12 extending upwardly from the top wall 3 and secured to the upper edge of said hopper. Said hopper is formed with a cylindrical delivery spout 13 through which the solid material passes to a feed opening 14 in the top plate 3. The rate of flow of solid material to said feed opening may be controlled and maintained uniform 2 by a suitable valve mechanism comprising, for example, two spaced plates 16 and 17 rigidly secured within the botom portion of the cylindrical spout 13 and a rotary plate 18 disposed between said fixed plates. The lower fixed plate 17 is shown as provided with an opening 17′ disposed directly over the opening 14 while the upper fixed plate 16 is such as provided with an opening 16′ diametrically opposite the opening 17′, each of said openings extending through an arc of somewhat less than 90°, as shown in Fig. 5. The rotary plate 18 is provided with two diametrically opposed openings 18′ each extending through an arc of approximately 90°, so that upon rotation of said rotary plate each of said openings 18′ is brought first beneath the opening 16′ so as to receive a measured quantity of material from the hopper and is subsequently brought to position over the opening 17′ so as to discharge such quantity of material through said last-named opening and through the opening 14 into the dispersion chamber. The rotary plate 18 may be secured to the lower end of a shaft 19 which extends through a central opening in plate 16 and is driven by electric motor 21 which is shown as operatively connected thereto through variable speed pulleys 22 and 23, belt 24 and reducing gear means 25. The upper end of hopper 11 may be open and the material may be delivered thereto through chute 27.

An outlet pipe 31 communicates substantially tangentially with the chamber A at the periphery thereof and adjacent the top of said chamber, through an opening 32 in the side wall 2. Said outlet opening and pipe are preferably of relatively small size as compared to the capacity of fan 5, so that only a relatively small portion of the total recirculating gas is directed through said outlet opening and pipe.

In the operation of this form of apparatus the fan impeller 5 is rotated at high velocity by means of electric motor 8 and causes the air within the chamber A to be set in rapid vortical motion, in which the air is forced outwardly between the fan blades at the lower portion of the chamber, thence upwardly in a rapidly whirling outer vortex such as indicated at $V_1$, then inwardly toward the axis of the chamber at the upper end thereof and thence downwardly in an inner vortex indicated at $V_2$, to the center of the fan. Due to the difference in pressure created at the axial and peripheral portions of the chamber, a relatively small quantity of air is continuously drawn in through the air inlet 7 and a corresponding quantity of air is continually discharged through the tangential outlet means 31.

The divided solid material to be dispersed is delivered into the vortical gas movement within the chamber by operation of the feeding means as above described, and is picked up by the whirling gas within the inner vortex and subjected thereby to centrifugal action. The coarser particles are, in general, driven by this centrifugal force into the upwardly moving outer vortex before reaching the position of the fan, while some of the finer particles may be carried downwardly with the air, through the fan impeller, and thence upwardly. The rapid motion of the air relative to the particles of solid material, in both the inner and outer vortices serves to shear or tear the particles from one another and to break up adhering clusters thereof.

The shearing action is especially intense and effective in the region adjacent the periphery of the dispersion chamber. The particles in this region are thrown by centrifugal force against the side wall of said chamber, and some of the particles, particularly the coarse particles, are caused to rebound therefrom out into the gas stream again, and the action is then repeated. Other particles remain close to the side wall but are repeatedly rolled over and over and, due to local eddy currents, are from time to time picked up by the gas and carried forward, to be again thrown out against the side wall. All of the particles are thus caused to repeatedly cross the stream lines of the rapid air movement and are thus subjected to a vigorous washing action.

As the air reaches the upper end of the vortical chamber a portion thereof, together with the dispersed solid material contained therein at relatively high concentration, is discharged through the tangential outlet means 31, while the remainder of the air and, in general, some of the finer particles of solid material, are recirculated in the chamber and repeat the above cycle of operations.

The form of apparatus shown in Figs. 6 and 7 comprises a vertically disposed cylindrical housing 1′ inclosing a dispersion chamber A′, said housing including as before a cylindrical side wall 2′ and top and bottom walls 3′ and 4′. The centrifugal fan indicated at 5′ is in this case located adjacent the upper end of chamber A′ and is mounted for rotation about the axis of said chamber. Said fan is secured to shaft 6′ driven by electric motor 8′ mounted on a suitable supporting structure as shown.

In this form of the invention the bottom wall 4′ is shown as comprising an inwardly extending substantially horizontal annular portion 4a′ and an inwardly and upwardly inclined frusto-conical central portion 4b′ provided with a central air inlet opening 7′. The outlet means is shown as comprising an outlet pipe 31′ communicating substantially tangentially with the lower end of chamber A′ at the periphery thereof, through opening 32′. The admission of air through opening 7′ may be controlled by means of a tapered valve member 36 which is vertically operable toward and away from said opening by any suitable operating means such as rod 37 and lever 38. Suitable positioning means 39 may also be provided cooperating with said lever to hold said valve in any position of adjustment. Lever 38 is pivotally mounted at 41 and is provided with a handle 42 for manual operation thereof, the other end of said lever being pivotally connected to rod 37 as at 43. Fixed guide means 44 engage rod 37 so as to keep the valve member 36 substantially centered with respect to opening 7′.

The centrifugal fan 5′ is shown in this case as provided with a horizontal disc or plate 46 disposed above the fan blades, and the divided material to be dispersed is delivered into the vortical gas movement by feeding the same onto said plate through an opening 47 in the top wall 3′. The means for supplying material to said opening is shown as comprising a feed hopper 48 and screw conveyor 49, said screw conveyor being preferably driven by the same driving means as the centrifugal fan 5′. For this purpose the shaft 51 of said screw conveyor is shown as operatively connected to the electric motor 8′ by means of gear 52 on said shaft 51, meshing with gear 53 on a shaft 54 which may be operatively connected or disconnected to shaft 54′ by suitable clutch means 56, said shaft 54′ being connected through bevel gears 57, shaft 58, pulley 59 and belt 61 to pulley 62 on the motor shaft 6′. By this means the speed of operation of the screw conveyor 49, when clutch means 56 is in engagement, is always proportional to the speed of operation of the centrifugal fan 5′, so that the rate of feed of divided material into the dispersion chamber is substantially proportional to the velocity of vortical gas movement therein, while the supply of divided material may be cut off at any time by disengagement of clutch means 56, while the centrifugal fan and driving motor are left in operation. This form of apparatus is, therefore, particularly adapted to cases in which it is desired to intermittently interrupt and resume the delivery of dispersed solid materials from the apparatus, as for example in the above-mentioned application of insecticidal dusts or powders or the like.

The operation of this form of apparatus differs from that of the form first described, chiefly in the relative position of introduction of the finely divided solid material with respect to the vortical gas movement. In this case the gas is forced outwardly by the fan at the upper end of the chamber and passes downwardly in a rapidly whirling outer vortex $V_1'$, thence inwardly toward the central portion of the chamber and upwardly in an inner vortex $V_2'$ to the central portion of the fan. The divided solid material delivered by conveyor 49 falls through opening 47 upon the rapidly whirling distributing plate or disc 46, which picks up the material and throws it outwardly by centrifugal force over the edge of said plate or disc and against the side wall of the chamber, where the material is picked up by the gas discharged from the ends of the fan blades and is carried along with the gas in the downwardly moving outer vortex $V_1'$. The whirling gas acts to separate and disperse the solid particles in substantially the same manner as above described so that by the time the solid material reaches the lower end of the chamber it is in substantially completely dispersed condition. A small portion of the gas from the outer vortex is continually diverted through the outlet means 31' and carries with it in suspension this dispersed solid material. A corresponding amount of gas is continually drawn in through the opening 7' and passes upwardly along with the recirculating gas in the inner vortex.

As stated above, the delivery of dispersed solid material from the apparatus may be cut off at any time without interrupting the operation of the fan, by simply disengaging the clutch 56 so as to stop operation of conveyor 49. Upon reengaging said clutch, the feed of divided solid material into the apparatus is resumed and the delivery of such material from the apparatus in dispersed condition starts almost immediately, a particular advantage of the above arrangement being that operation may be thus suspended and again resumed without requiring any delay for bringing the fan up to speed and establishing the vortical gas movement.

The form of apparatus shown in Fig. 8 is substantially the same as that shown in Figs. 6 and 7 with the exception that the side wall 2'' of the dispersion chamber housing is frusto-conical instead of cylindrical in shape and tapers inwardly from the upper end at which the centrifugal fan 5' is located toward the lower end at which the gas outlet 31' is located. Except for this difference the parts of the apparatus are of the same construction and relative arrangement as above described in connection with Figs. 6 and 7, and are similarly numbered in the drawings. The operation of this form of apparatus is also substantially the same as in Figs. 7 and 8 with the exception that the outer descending vortex decreases in diameter as it passes downwardly, and a somewhat larger proportion of the gas may thus be caused to pass from the outer vortex into the ascending inner vortex before reaching the lower end of the chamber than is the case when a cylindrical chamber is used.

It will be seen that in the operation of each of the forms of apparatus above described, a vortical movement of gas is continually maintained in the inclosed dispersion chamber, and the major portion of the gas is repeatedly recirculated in this vortical movement, a certain proportion of the gas however being continually withdrawn from the vortical movement at one point in the path of circulation of the gases and a corresponding portion of gas being continually introduced at another point in said path, and the finely divided solid material to be dispersed is delivered into the vortical gas movement at a point somewhat removed from the point of gas withdrawal and sufficiently in advance thereof in the path of circulation of the gas to permit substantially complete dispersion of such material in the gas by means of the above described dispersing action before reaching the gas outlet, the material so dispersed being carried off in suspension in the gas withdrawn through said outlet.

More specifically it will be seen that the gas is repeatedly recirculated in inner and outer vortices moving in reverse directions longitudinally of the axis of such movement, such circulation being effected by applying a rotative force to the gas at one end of the dispersion chamber so as to maintain the necessary whirling motion and the necessary difference in pressure between the outer and inner vortices at this end of the chamber. While the outer vortex is shown in the drawings, for the purpose of illustration, as proceeding from the end at which such rotative force is applied to the gas to the other end of the chamber, it will be understood that in general, as the velocity of whirling movement decreases in moving toward the other end of the chamber a portion of the gas will continually be forced or drawn inwardly from the outer vortex into the inner vortex and thus have its longitudinal component of motion reversed before reaching the further end of the chamber, but the centrifugal force acting on the particles of solid material will be sufficient to substantially prevent such material, with the possible exception of the more finely divided particles thereof from being thus drawn inwardly along with this portion of the gas, so that substantially all the solid material is carried along in the outer vortex to the end of the chamber opposite the centrifugal fan, where the outlet means for gas and dispersed solid material is located.

In the form of the invention shown in Figs. 1 to 5 inclusive, the material to be dispersed is delivered into the vortical gas movement at the end opposite the centrifugal fan and first enters the inner vortex moving longitudinally toward said fan and reaches the outer vortex either by being thrown into the same by centrifugal force or by being carried along with the gas through the fan and into said outer vortex. On the other hand, in the forms of apparatus shown in Figs. 6 to 8 inclusive, the material to be dispersed is delivered into the outer vortex at the end adjacent the centrifugal fan and is carried along in this outer vortex until it reaches the gas outlet at the opposite end thereof, where the major portion of such material is removed and only the extremely fine particles may be recirculated with the gas.

I claim:

1. The method of dispersing finely divided solid material in gas which comprises maintaining a vortional gas movement within an inclosed chamber, repeatedly recirculating the major portion of the gas in such vortical movement in such manner that the gas moves repeatedly from one end of the chamber toward the other end thereof and back again, delivering finely divided solid material into the vortical gas movement at one point in the path of circulation thereof, removing a portion of the gas containing dispersed solid material in suspension from the vortical movement at another point in said path, and introducing a corresponding portion of gas to said vortical movement at a point removed from said last named point.

2. The method of dispersing finely divided solid material in gas which comprises maintaining a vortical movement of gas within an inclosed chamber while continually recirculating the major portion of such gas in inner and outer vortices moving in opposite directions longitudinally of the axis of vortical movement, delivering divided solid material to be dispersed into said vortical movement at one point in the path of circulation thereof, removing the portion of a gas containing dispersed solid material in suspension from the outer vortex at a point somewhat removed from said first-named point, and introducing additional gas into said vortical movement at a point removed from said point of removal of gas and solids.

3. The method as set forth in claim 2, in which the solid material to be dispersed is delivered into the outer vortex of the gas adjacent the end of the chamber from which said outer vortex proceeds, and the gas and dispersed solids are removed from the outer vortex adjacent the opposite end of the chamber.

4. An apparatus for dispersing finely divided solid material in gas comprising a housing having a circular cross-section whose interior constitutes a dispersion chamber, a centrifugal fan mounted within said chamber and adjacent one end only thereof and rotatable about the axis of said chamber, gas outlet means communicating with said chamber adjacent the periphery thereof at the end opposite said centrifugal fan, means for delivering divided solid material to said chamber at a position somewhat removed from said gas outlet means, and gas inlet means communicating with said chamber adjacent the axis thereof.

5. An apparatus for dispersing finely divided solid material in gas comprising a cylindrical housing whose interior constitutes a dispersion chamber, a centrifugal fan mounted within said chamber and rotatable about the axis of said chamber, gas outlet means communicating with said chamber at one end thereof and adjacent the periphery thereof, said centrifugal fan being located at a part of said chamber remote from the end at which the gas outlet means is located, means for delivering divided solid material to be dispersed into said chamber at a position somewhat removed from said gas outlet means, and gas inlet means communicating with said chamber at a position somewhat removed from said gas outlet means, said gas outlet and gas inlet means being so restricted in size as to provide outflow and inflow therethrough of only a relatively small proportion of the gas circulated by said fan.

6. An apparatus as set forth in claim 5, said gas inlet means communicating with said chamber adjacent the axis thereof.

7. An apparatus as set forth in claim 5, said gas outlet means communicating with said chamber adjacent the end opposite said centrifugal fan.

8. An apparatus as set forth in claim 5, said gas outlet means communicating with said chamber adjacent the end opposite said fan and the means for delivering divided solid material being so disposed as to deliver such material into said chamber adjacent the position of said fan.

9. An apparatus for dispersing finely divided solid material in gas comprising a housing of circular cross-section having its axis substantially vertical, the interior of said housing constituting a dispersion chamber, a centrifugal fan mounted within said chamber adjacent the upper end only thereof and rotatable about the axis of said chamber, gas outlet means communicating peripherally with said chamber adjacent the lower end thereof, gas inlet means communicating substantially axially with said chamber adjacent the lower end thereof, and means for delivering finely divided solid material to said chamber adjacent the upper end thereof.

10. An apparatus as set forth in claim 9, said means for delivering finely divided solid material comprising a plate secured to said fan and disposed above the impeller blades thereof and extending transversely with respect to the axis of rotation of said fan, and means for delivering such material onto said plate.

In testimony whereof I have hereunto subscribed my name this 29th day of June, 1931.

MARCEL A. LISSMAN.